Patented Sept. 26, 1950

2,523,710

UNITED STATES PATENT OFFICE 2,523,710

ADDITION COMPOUNDS OF CINNAMALDEHYDE AND CERTAIN MALONIC AND CYANOACETIC ESTERS

Owen A. Moe and Donald T. Warner, Minneapolis, Minn., assignors to General Mills, Inc., a corporation of Delaware No Drawing. Application February 18, 1949,
Serial No. 77,285

9 Claims. (Cl. 260—465)

The present invention relates to novel aldehyde compounds having the following formula:

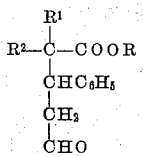

in which R is a low alkyl group containing from one to four carbon atoms, $R^1$ is selected from the group consisting of CN and COOR, and $R^2$ is an aliphatic hydrocarbon group. These compounds contain several functional groups which render them suitable for further use in the synthesis of substituted indoles, alcohols, acids, and other organic compounds.

It is therefore an object of the present invention to provide novel aldehyde compounds having the above formula.

It is a further object of the present invention to provide a novel process of producing such compounds.

These aldehydes may be prepared by the 1,4 addition of alkyl substituted malonic esters and alkyl substituted cyanoacetic esters to cinnamyl aldehyde, which addition results in the direct production of the desired aldehyde. These reactions are carried out in the presence of an alkaline catalyst such as an alkali metal alkoxide, or in the presence of certain basic materials such as tertiary amines, for example, tributylamine. With the alkali metal alkoxide catalyst the amount of catalyst is preferably held within the range of approximately 0.001 to 0.10 mole per mole of reagent used. Variations of catalyst outside this range may be employed, but in general, when the amount of catalyst exceeds the one-tenth mole ratio, there is a tendency for side reactions which cut down the yield of the desired aldehyde, and accordingly such higher molar ratios of catalyst are not preferred. With other catalysts such as tributylamine, the amount of catalyst is not as critical and it is possible to use much larger quantities of catalyst up to equimolar proportions.

The reaction is carried out in the presence of a suitable solvent diluent which does not enter into the reaction. Almost any solvent diluent which meets this test may be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal to the volume of the ester employed. In general, the larger the quantity of solvent employed, the easier it is to control the reaction in the desired direction. It is apparent that the quantity of solvent employed is limited by the problem of recovering the solvent.

The temperature employed during the addition reaction is subject to considerable change. Usually a temperature within the range of 0–50° C. is desirable. At temperatures above 50° C. there is some possibility of side reactions.

In carrying out the reaction, it is preferred to prepare a solution of the malonic ester or the cyanoacetic ester in the solvent, and to add the catalyst to this solution. The resultant solution is then cooled to a suitable temperature for reaction, and the unsaturated aldehyde is added slowly to the solution over an extended period of time. In this way it is possible to control the temperature of the reaction mixture very readily to within the desired range, and thus to control the reaction in the desired direction. After the reaction has been completed, the catalyst may be neutralized and the product worked up in a conventional manner.

The reaction is applicable to a wide variety of substituted malonic esters and substituted cyanoacetic esters. The alcoholic group of the malonic ester or cyanoacetic ester may be either methyl, ethyl, propyl, or butyl. However, inasmuch as these esters are conveniently available in the form of the ethyl ester, this form is preferred. Likewise considerable variation is possible in the aliphatic hydrocarbon substituent on the active methylene group of the malonic ester or cyanoacetic ester. This substituent may be a low aliphatic hydrocarbon substituent, such as methyl, ethyl, propyl, or butyl, or it may be a higher aliphatic hydrocarbon substituent, such as the aliphatic hydrocarbon substituted malonates prepared by the reaction of higher fatty acid esters with oxalate esters in accordance with the disclosure of Floyd and Miller (J. A. C. S., vol. 69, p. 2354 (1947)). According to this disclosure, a substituted malonate is obtained which has an aliphatic hydrocarbon substituent two carbon atoms shorter than that of the fatty acid from which it is derived. In view of the scarcity of fatty acids having more than eighteen carbon atoms, it is apparent therefore that it is not preferred to employ aliphatic hydrocarbon substituted malonic esters having more than sixteen carbon atoms in the aliphatic hydrocarbon substituent. It will be apparent, however, that if higher aliphatic hydrocarbon substituents are desired, they can be obtained from the less readily available fatty acids having the suitable chain length. There are, of course, other methods of preparing alkyl substituted malonic esters and alkyl substituted cyanoacetic esters, and these may be used for the preparation of compounds having any desired length of aliphatic hydrocarbon substituent. It will be appreciated also that the aliphatic hydrocarbon substituent may be either saturated or unsaturated.

The following examples will serve to illustrate the invention:

*Example 1*

Ethyl ethylmalonate (0.3 mole) was dissolved in 100 cc. of absolute ethanol containing 0.1 g. of sodium. The reaction mixture was cooled to 5° C. Cinnamyl aldehyde (0.3 mole) was added dropwise. The temperature increased to 7° C. and the reaction mixture was permitted to stand overnight at 6° C. After neutralization, the ethanol was removed by concentration in vacuo. A very viscous residual oil was obtained showing no tendencies toward crystallization. This residual oil was dissolved in benzene and the benzene solution was washed with three 200 cc. portions of water. After drying, the benzene was removed by concentration in vacuo yielding a light yellow oil. This residual oil was distilled under diminished pressure. The forerun consisted primarily of ethyl ethylmalonate and cinnamyl aldehyde. The gamma, gamma-dicarbethoxy-gamma-ethyl-beta-phenylbutyraldehyde was collected over the range of 157–178° C. (1.1–1.5 mm.). This material was redistilled and gamma, gamma - dicarbethoxy - gamma - ethyl - beta - phenyl - butyraldehyde was collected at 139–140° C. (0.3 mm.) $n_D^{25}=1.5020$. This redistilled product was treated with 2,4-dinitrophenylhydrazine and the 2,4-dinitrophenylhydrazone of gamma,gamma - dicarbethoxy - gamma - ethyl - beta - phenylbutyraldehyde was obtained as a crystalline solid melting at 109–110° C.

Analysis calcd. for $C_{24}H_{28}O_8N_4$: C 57.6, H 5.6, N 11.2; found: C 57.33, H 5.5, N 11.44.

*Example 2*

Absolute ethanol (40 ml.) was reacted with 0.07 g. of sodium and the resulting sodium ethoxide solution was mixed with ethyl butylcyanoacetate (20 g.) and the mixture was cooled to 0° C. Cinnamyl aldehyde (15 g.) was added dropwise while the temperature was maintained at 0° C. The reaction mixture was allowed to warm to room temperature and react for an additional 3½ hours. The catalyst was neutralized by the addition of 0.8 g. of glacial acetic acid and the clear light yellow solution was concentrated in vacuo. The residual oil was dissolved in benzene (125 ml.) and washed with five 60 ml. portions of water. The benzene layer was dried and the solvent removed in vacuo. The residual oil was distilled. The product, gamma-carbethoxy-gamma - cyano - gamma - butyl - beta - phenylbutyraldehyde was collected over the range 136–150° C. (0.26–0.5 mm.). This material was redistilled and the main fraction was collected at 143–145° C. (0.28 mm.). The 2,4-dinitrophenylhydrazone of gamma-carbethoxy-gamma-cyano-gamma - butyl - beta - phenylbutyraldehyde was prepared in the usual manner and after crystallization from an ethanol-ethyl acetate solvent mixture, it melted at 153–153.5° C.

Analysis calcd. for $C_{24}H_{27}O_6N_5$: C 59.86, H 5.65, N 14.55; found: C 59.64, H 5.50, N 14.84.

Compounds of the type disclosed in the present invention may be converted into new and novel indole derivatives as shown below:

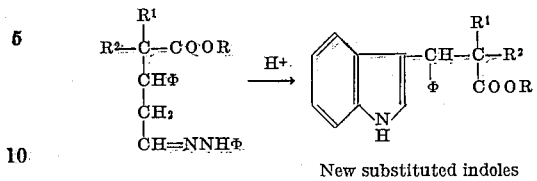

New substituted indoles

Alcohols may be produced by the reduction of a carbonyl group as indicated in the following reaction:

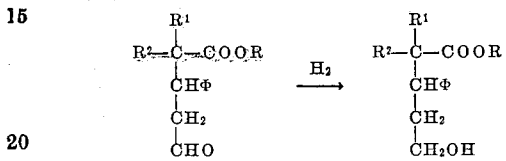

Conversion of the carbonyl group to a carboxyl group results in new and interesting substituted glutaric acids as shown by the following reaction:

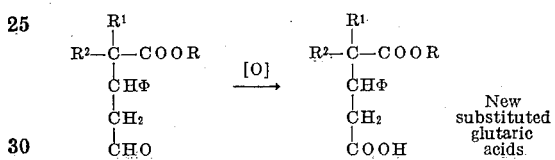

New substituted glutaric acids

The synthesis of interesting organic intermediates may be accomplished by reaction with ethyl cyanoacetate in accordance with the following equation:

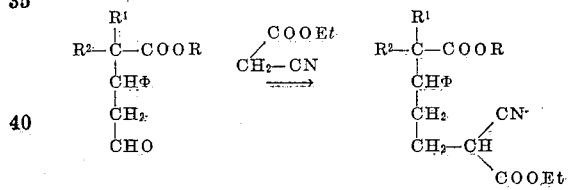

The aldehydes of the present invention may also be employed in the synthesis of new hydantoins in accordance with the following reaction:

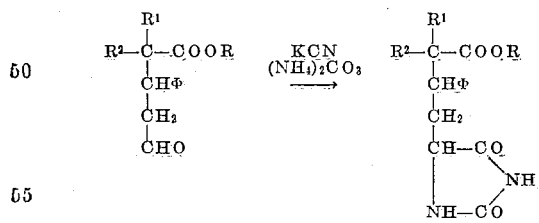

While various modifications of the invention have been described, it is to be understood that the invention is not limited thereto, but that other variations are possible without departing from the spirit thereof.

We claim as our invention:

1. Aldehyde compounds having the following formula:

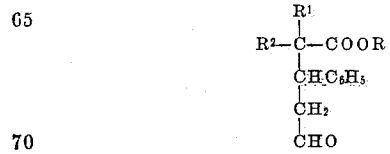

in which R is an alkyl group containing from one to four carbon atoms, $R^1$ is selected from the group consisting of CN and COOR, and $R^2$ is a non-acetylenic aliphatic hydrocarbon substituent containing from 1 to 16 carbon atoms.

2. Aldehyde compounds having the following formula:

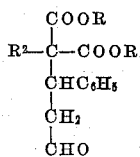

in which R is an alkyl group containing from one to four carbon atoms, and $R^2$ is a non-acetylenic aliphatic hydrocarbon substituent containing from 1 to 16 carbon atoms.

3. Aldehyde compounds having the following formula:

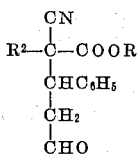

in which R is an alkyl group containing from one to four carbon atoms, and $R^2$ is a non-acetylenic aliphatic hydrocarbon substituent containing from 1 to 16 carbon atoms.

4. Aldehyde compounds having the following formula:

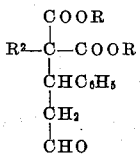

in which R and $R^2$ are alkyl groups containing from one to four carbon atoms.

5. Aldehyde compounds having the following formula:

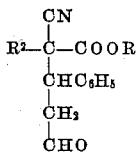

in which R and $R^2$ are alkyl groups containing from one to four carbon atoms.

6. Process of preparing aldehyde compounds having the following formula:

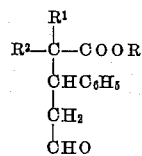

in which R is an alkyl group containing from one to four carbon atoms, $R^1$ is selected from the group consisting of CN and COOR, and $R^2$ is a non-acetylenic aliphatic hydrocarbon group containing from 1 to 16 carbon atoms, which comprises reacting a compound selected from the group consisting of aliphatic hydrocarbon substituted cyanoacetic esters and malonic esters, with cinnamyl aldehyde, in the presence of an alkaline catalyst.

7. Process of preparing aldehyde compounds having the following formula:

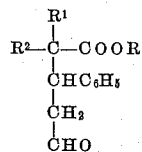

in which R is an alkyl group containing from one to four carbon atoms, $R^1$ is selected from the group consisting of CN and COOR, and $R^2$ is a non-acetylenic aliphatic hydrocarbon group containing from 1 to 16 carbon atoms, which comprises preparing a solution of a compound selected from the group consisting of aliphatic hydrocarbon substituted malonic esters and cyanoacetic esters, in an inert solvent, and reacting said solution with cinnamyl aldehyde in the presence of an alkaline catalyst at a temperature not substantially in excess of 50° C.

8. Gamma,gamma-dicarbethoxy-gamma-ethyl-beta-phenylbutyraldehyde.

9. Gamma-carbethoxy-gamma-cyano-gamma-butyl-beta-phenylbutyraldehyde.

OWEN A. MOE.
DONALD T. WARNER.

No references cited.